(12) United States Patent
Lacaze et al.

(10) Patent No.: US 10,406,758 B2
(45) Date of Patent: Sep. 10, 2019

(54) SYSTEM AND METHOD FOR 3D PRINTING PARTS WITH ADDITIONAL FEATURES

(71) Applicant: Robotic Research, LLC

(72) Inventors: Alberto Daniel Lacaze, Potomac, MD (US); Karl Nicholas Murphy, Rockville, MD (US)

(73) Assignee: Robotic Research, Gaithersburg, MD (US)

( * ) Notice: Subject to any disclaimer, the term of this patent is extended or adjusted under 35 U.S.C. 154(b) by 1251 days.

(21) Appl. No.: 14/539,921

(22) Filed: Nov. 12, 2014

(65) Prior Publication Data

US 2015/0128528 A1 May 14, 2015

Related U.S. Application Data

(60) Provisional application No. 61/903,343, filed on Nov. 12, 2013.

(51) Int. Cl.
*B29C 64/00* (2017.01)
*B29C 67/00* (2017.01)
*B29C 64/20* (2017.01)
*B33Y 10/00* (2015.01)
*B33Y 30/00* (2015.01)
*B33Y 40/00* (2015.01)

(52) U.S. Cl.
CPC .......... *B29C 67/0085* (2013.01); *B29C 64/00* (2017.08); *B29C 64/20* (2017.08); *B33Y 10/00* (2014.12); *B33Y 30/00* (2014.12); *B33Y 40/00* (2014.12)

(58) Field of Classification Search
CPC ........ B29C 2947/92704; B29C 47/025; B29C 70/06; B29C 64/00; B29C 64/01; B29C 64/30; B29C 64/188; B29C 64/209; B29C 64/371; B29C 64/10
USPC .................................... 53/428; 700/119–120
See application file for complete search history.

(56) References Cited

U.S. PATENT DOCUMENTS

| 4,726,170 | A | * | 2/1988 | Sawa | B65B 43/30 53/386.1 |
| 5,503,785 | A | * | 4/1996 | Crump | B33Y 10/00 264/308 |
| 6,165,406 | A | * | 12/2000 | Jang | G05B 19/4099 264/308 |
| 7,073,561 | B1 | * | 7/2006 | Henn | B22F 3/003 164/271 |

(Continued)

FOREIGN PATENT DOCUMENTS

WO WO-2013066269 A1 * 5/2013 ......... H01L 23/53276

*Primary Examiner* — Andrew M Tecco
*Assistant Examiner* — Eyamindae C Jallow
(74) *Attorney, Agent, or Firm* — Radha Narayanan

(57) ABSTRACT

An apparatus and method for multi-stage printing teaches a 3D printer in combination with one or more additional dispensing nozzles. One or more additional dispensing nozzles are combined with the 3D for filling cavities with other compounds such as foam, sterilizing parts by spraying printed mold with disinfectant or antibacterial treatments, and embedding parts or other materials such as paper, fiberglass, or carbon fiber within the printing layers for additional strength and changing mold properties of a final product. In other embodiments, the apparatus of the present invention can be used in combination with a robotic packaging mechanism for bagging sterilized parts for shipment.

16 Claims, 2 Drawing Sheets

(56) References Cited

U.S. PATENT DOCUMENTS

| | | | | |
|---|---|---|---|---|
| 7,937,916 B2* | 5/2011 | Thierig | | B65B 41/16 53/386.1 |
| 9,248,501 B1* | 2/2016 | Johannes | | B22F 1/0096 |
| 9,694,544 B2* | 7/2017 | Mark | | B29C 67/0088 |
| 2007/0277860 A1* | 12/2007 | Jonsson | | A61L 2/18 134/201 |
| 2008/0169589 A1* | 7/2008 | Sperry | | B33Y 30/00 264/494 |
| 2009/0014907 A1* | 1/2009 | Kuo | | B29C 33/565 264/220 |
| 2010/0206224 A1* | 8/2010 | Thurner | | B29C 64/106 118/620 |
| 2010/0245489 A1* | 9/2010 | Desai | | B41J 2/03 347/68 |
| 2010/0307838 A1* | 12/2010 | Stevens | | B22D 19/06 175/374 |
| 2010/0310786 A1* | 12/2010 | Dunne | | A61C 13/0004 427/487 |
| 2013/0085590 A1* | 4/2013 | Bryan | | G09B 23/30 700/98 |
| 2013/0292039 A1* | 11/2013 | Peters | | B29C 70/52 156/168 |
| 2013/0295338 A1* | 11/2013 | Keating | | B28B 19/003 428/174 |
| 2014/0065194 A1* | 3/2014 | Yoo | | B29C 67/0081 424/400 |
| 2014/0246813 A1* | 9/2014 | Bauman | | B33Y 30/00 264/494 |
| 2015/0145177 A1* | 5/2015 | El-Siblani | | B29C 67/007 264/497 |
| 2015/0328719 A1* | 11/2015 | Jarvis | | B23K 1/0053 219/76.12 |
| 2016/0074911 A1* | 3/2016 | Dore | | B08B 3/006 134/56 R |
| 2016/0167312 A1* | 6/2016 | Feinberg | | B29C 67/0059 264/239 |
| 2017/0106651 A1* | 4/2017 | Chung | | B41J 2/14129 |

* cited by examiner

SYSTEM AND METHOD FOR 3D PRINTING PARTS WITH ADDITIONAL FEATURES

CROSS REFERENCE TO RELATED APPLICATIONS

This application claims priority from U.S. Provisional Patent Application Ser. No. 61/903,343, entitled "System and Method for 3D Printing Parts with Additional Features", filed on Nov. 12, 2013. The benefit under 35 USC § 119e of the United States provisional application is hereby claimed, and the aforementioned application is hereby incorporated herein by reference.

TECHNICAL FIELD OF THE INVENTION

The present invention relates generally to rapid prototyping using 3D printers. More specifically, the present invention relates to rapid prototyping using 3D printers where printing is combined with other features such as insulation, sterilization, and embedding.

BACKGROUND OF THE INVENTION 3D printing is making great strides and is evolving into the manufacturing of multi-component devices. In order to manufacture such devices, printing must be complemented by secondary features such as providing sterilization, embedding of additional parts within the printed area, and the additional of other compounds inside cavity molds.

SUMMARY OF THE INVENTION

The proposed apparatus and method for multi-component devices teaches means for providing a second dispensing nozzle for filling cavities with other compounds such as foam, sterilizing parts, and embedding parts or additional elements within the printing layers for additional strength and changing mold properties of a final product.

BRIEF DESCRIPTION OF THE DRAWINGS

The accompanying drawings, which are incorporated herein an form a part of the specification, illustrate the present invention and, together with the description, further serve to explain the principles of the invention and to enable a person skilled in the pertinent art to make and use the invention.

DETAILED DESCRIPTION OF THE INVENTION

Figure 1:
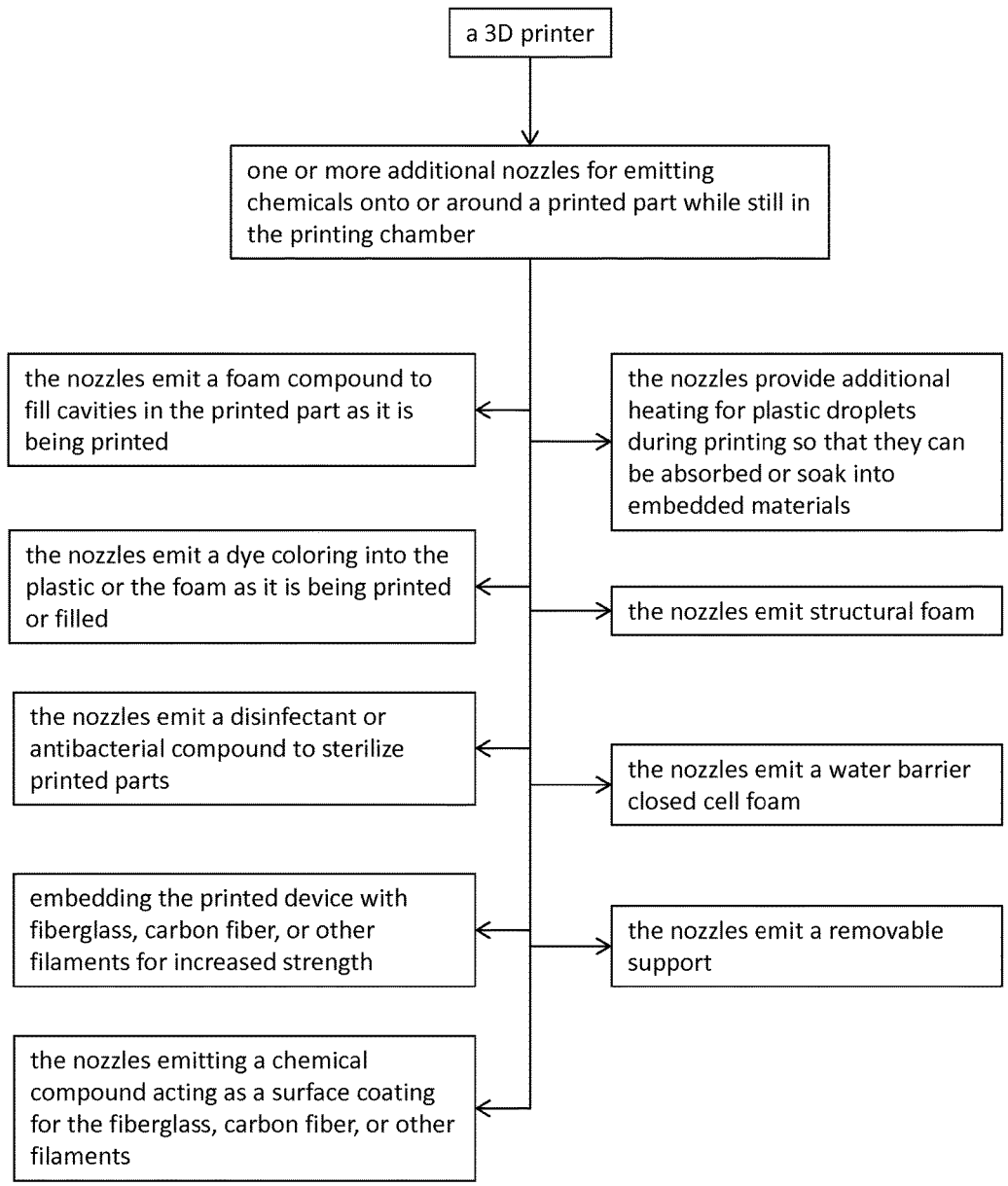
FIGS. 1-2 are flow charts illustrating the method of the present invention.
Figure 2:

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Rapid prototyping or 3D printing has been a dream of engineers and architects for centuries. In the past decade, rapid prototyping machines have evolved some significant characteristics that can make them useful for this problem.

As expected, field repair of these systems will become trivial by reprinting parts that have been broken, lost, or worn out. Standard parts like motors can be reused, and plastic can be recycled, further minimizing the operational footprint. These parts can be printed by untrained personnel. Parts that would be hard or impossible to machine now can easily be generated in minutes.

A new problem has arisen where more complex parts are desired to be created by 3D printing. These parts are those that require that a part of a component to be printed with embedded compounds or components, combining the 3D printer with other dispensing means for ejecting foam or other compounds into mold cavities, and sterilizing parts.

In the first embodiment, a 3D printer could be used in combination with one or more additional nozzles for dispensing one or more chemical compounds such as disinfectant or antibiotics. In this embodiment, the 3D printer would be deployed in a container used in a military or rescue setting where the container is equipped with medical supplies. The 3D printer would be used to print bandages and other medical equipment that can be sprayed or embedded during the printing process with chemicals such as disinfectants and antibiotics. The printed and chemically enhanced products could be further combined with automated machines for bagging equipment for transportation to various locations on a battlefield or in a rescue operation. The container with 3D printer would be able to produce a wide range of medical supplies on an as-needed basis from the base materials and chemicals stored in the container with the machinery in a sterile environment. The container would also be maintained in a sterile condition in this embodiment.

In another embodiment, the additional nozzles can be adapted to spray other chemical compounds such as foam. Filling part cavities with foam enables the printing of floating parts as well as insulated parts for parts or devices that require insulation for temperature, vibration, or other forces. The combination of a 3D printer with secondary spray nozzles enables the manufacturing of more complex parts.

In still another embodiment, the spray nozzle can be adapted to inject a dye into the plastic before it is emitted by the 3D printer or as the 3D printer is emitting the drop of heated and melted plastic material to providing coloring of the printed object. The would especially beneficial in military operations where the color or camouflaging of printed devices is critical to their operation in various conditions and locations which have varying background coloring. This would also be as important in rescue operations where the desired coloring may be a bright color so that easy detection and location of the printed part is readily available.

In yet another application, the additional nozzles may be adapted to spray chemicals or to provide coatings that would strength a printed part or parts of a printed part. In this embodiment, a nozzle may be able to provide additional heating to the printed plastic before it is emitted to enable it to soak through or into paper, fiberglass, or carbon fiber layers placed on the printed part in various locations. The nozzle can also be adapted to emit resin or other required coats for curing and protecting a fiberglass or carbon fiber reinforcement of a printed part. For example, the nozzle can emit the gel coating for the surface treatment of a fiberglass coating or embedded section within a printed part.

In still another embodiment, the nozzles emit structural foam, a water barrier closed cell foam and when using lighter than air foam the part is printed upside down. The foam emissions can also be used to create removable sections or supports from the part either during partial printing or after final printing.

In another embodiment of the present invention, the atmostphere inside the chamber can not only be sterilized, but it can be removed creating a vacuum or after a vacuum is created, any gaseous mixture can be pumped into the chamber to replace the atmosphere. Such an application would be creating a vacuum to create lighter parts, or filling cavities in a part with inert gases or lighter gases to change buoyancy.

The system is set to run on a computing device. A computing device on which the present invention can run would be comprised of a CPU, Hard Disk Drive, Keyboard, Monitor, CPU Main Memory and a portion of main memory where the system resides and executes. Any general-purpose computer with an appropriate amount of storage space is suitable for this purpose. Computer Devices like this are well known in the art and are not pertinent to the invention. The system can also be written in a number of different languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The embodiments of the invention in which an exclusive property or privilege is claimed are defined as follows:

1. A method for multi-stage 3D printing combined with insulation, sterilization, and embedding, consisting of
   a 3D printer;
   one or more additional nozzles for emitting chemicals for insulation, sterilization, and embedding onto, in, or around a printed part while the printed part is still in a printing chamber; and
   printing the part in an upside down orientation when printing with a foam material that is less dense when compared to the atmosphere of the printing environment.

2. The method of claim 1, wherein the nozzles emit a foam compound to fill cavities in the printed part as it is being printed.

3. The method of claim 1, wherein the nozzles emit a dye coloring into a plastic or a foam as it is being printed or filled.

4. The method of claim 1, wherein the nozzles emit a disinfectant or antibacterial compound to sterilize printed parts.

5. The method of claim 4, in combination with an automatic packaging system for bagging printed and sterilized parts for shipping.

6. The method of claim 1, further comprising the steps of embedding the printed device with fiberglass, carbon fiber, or other filaments; and
   the nozzles emitting a chemical compound acting as a surface coating for the fiberglass, or carbon fiber.

7. The method of claim 1, wherein the nozzles provide additional heating for plastic droplets added during printing of a part so that the plastic droplets can be absorbed or soaked into one or more prior or subsequently printed embedded materials during the printing of the part.

8. The method of claim 1, wherein the chamber is maintained as sterile.

9. The method of claim 1, wherein the nozzles emit structural foam.

10. The method of claim 1, wherein the nozzles emit a water barrier closed cell foam.

11. The method of claim 1, wherein the nozzles emit a removable support.

12. The method of claim 1, wherein a vacuum is maintained in the chamber.

13. The method of claim 12, wherein
   the vacuum in the chamber creates vacuumed chambers in the part
   a gaseous mixture is pumped into the chamber to replace the atmosphere; and
   the chambers are filled in a part with inert gases or lighter gases to change buoyancy properties of the printed part.

14. The method of claim 1, wherein a gaseous atmosphere is maintained in the chamber.

15. The method of claim 14, wherein the gaseous atmosphere is comprised of inert gases.

16. The method of claim 15, wherein the gaseous atmosphere in the chamber creates gaseous pockets trapped in the part.

* * * * *